(12) United States Patent
Jeddeloh

(10) Patent No.: US 8,291,131 B2
(45) Date of Patent: Oct. 16, 2012

(54) DATA TRANSFER MANAGEMENT

(75) Inventor: Joe M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 579 days.

(21) Appl. No.: 12/498,151

(22) Filed: Jul. 6, 2009

(65) Prior Publication Data

US 2011/0004722 A1 Jan. 6, 2011

(51) Int. Cl.
*G06F 13/00* (2006.01)
*G06F 3/00* (2006.01)

(52) U.S. Cl. .................... 710/33; 710/2; 710/8; 710/15; 710/32; 710/5

(58) Field of Classification Search ........................ None
See application file for complete search history.

(56) References Cited

U.S. PATENT DOCUMENTS

| | | | |
|---|---|---|---|
| 2008/0263259 | A1 | 10/2008 | Sadovsky et al. |
| 2009/0089492 | A1 | 4/2009 | Yoon et al. |
| 2010/0115178 | A1* | 5/2010 | Sauber .................. 711/103 |
| 2010/0325351 | A1* | 12/2010 | Bennett .................. 711/103 |

FOREIGN PATENT DOCUMENTS

| | | |
|---|---|---|
| KR | 20090046567 | 5/2009 |
| WO | WO-2008070173 A1 | 6/2008 |
| WO | WO-2011005763 A2 | 1/2011 |

OTHER PUBLICATIONS

Load Balancing System Design, Jun. 2008, Fulcrum Microsystems, [online, accessed on Dec. 16, 2011], URL: http://www.fulcrum-micro.com/documents/applications/Load_Balancing_Systems_v03.pdf.*
"International Application Serial No. PCT/US2010/041070, Search Report mailed Feb. 10, 2011", 5 pgs.
"International Application Serial No. PCT/US2010/041070, Written Opinion mailed Feb. 10, 2011", 3 pgs.
"International Serial No. PCT/US2010/041070, International Preliminary Report on Patentability mailed Jan. 19, 2012", 5 pgs.

* cited by examiner

*Primary Examiner* — Scott Sun
(74) *Attorney, Agent, or Firm* — Schwegman, Lundberg & Woessner, P.A.

(57) ABSTRACT

Methods, controllers, and systems for managing data transfer, such as those in solid state drives (SSDs), are described. In some embodiments, the data transfer between a host and a memory is monitored and then assessed to provide an assessment result. A number of storage units of the memory allocated to service another data transfer is adjusted based on the assessment result. Additional methods and systems are also described.

28 Claims, 7 Drawing Sheets

LU SIZE = 128KB

| MEMORY REQUEST SIZE (KB) 420 | WA (LUs=2) 430 | WA (LUs=4) 440 | WA (LUs=6) 450 | WA (LUs=10) 460 |
|---|---|---|---|---|
| 2 | 128.0 | 256.0 | 384.0 | 640.0 |
| 4 | 64.0 | 128.0 | 192.0 | 320.0 |
| 20 | 12.8 | 25.6 | 38.4 | 64.0 |
| 50 | 5.1 | 10.2 | 15.4 | 25.6 |
| 120 | 2.1 | 4.3 | 6.4 | 10.7 |
| 180 | 1.4 | 2.8 | 4.3 | 7.1 |
| 200 | 1.3 | 2.6 | 3.8 | 6.4 |
| 240 | 1.1 | 2.1 | 3.2 | 5.3 |
| 500 | 0.5 | 1.0 | 1.5 | 2.6 |

DATA TRANSFER MANAGEMENT

BACKGROUND

Electronic devices commonly have some type of memory system, such as a bulk storage device, available to them. A common example is a hard disk drive (HDD). HDDs are capable of large amounts of storage at relatively low cost, with current consumer HDDs available with over one terabyte of capacity. HDDs generally store data on rotating magnetic media or platters. In practice, the resulting data signal is an analog signal whose peaks and valleys are a consequence of the magnetic flux reversals of the data pattern.

HDDs have certain drawbacks due to their mechanical nature. HDDs are susceptible to damage or excessive read write errors due to shock, vibration or strong magnetic fields. In addition, they are relatively large users of power in portable electronic devices. Another example of a bulk storage device is a solid state drive (SSD). Instead of storing data on rotating media, SSDs utilize semiconductor memory devices to store their data, often including an interface and form factor that makes them appear to their host system as if they are a typical HDD. The memory devices of SSDs may comprise non-volatile flash memory devices.

BRIEF DESCRIPTION OF THE DRAWINGS

Some embodiments of the disclosed technology are illustrated by way of example and not limitation in the FIGS. of the accompanying drawings in which:

FIG. 4 is a table illustrating lists of some variables involved in managing data writes to an SSD, according to various embodiments of the invention;

DETAILED DESCRIPTION

Example methods and systems for managing data transfers will be described. In the following description for the purpose of explanation, numerous examples having example-specific details are set forth to provide an understanding of example embodiments. It will be evident, however, to one skilled in the art that the present examples may be practiced without these example-specific details, and/or with different combinations of the details than are given here.

Some example embodiments described herein may include monitoring a data transfer (e.g., a data write) between a host and a memory. The data transfer profile may be assessed and an assessment result may be provided. A future data transfer may be adjusted based on the assessment result. For the purposes of this document, a data transfer profile comprises, for example, one or more values associated with, for example, the sizes of the data transfers (e.g., number of bytes transferred), write amplification value, and write bandwidth, as will be described in more detail below.

Figure 1:
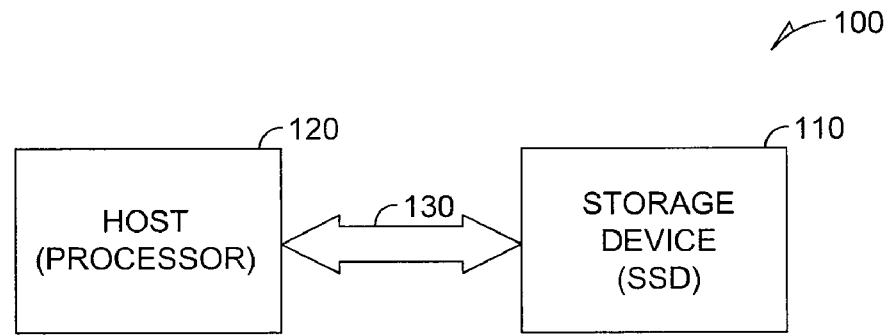
FIG. 1 is a diagram illustrating a system for managing data writes to a solid state drive (SSD), according to various embodiments of the invention.

FIG. 1 is a diagram illustrating a system 100 for managing data writes to a solid state drive (SSD) 110, according to various embodiments of the invention. The system 100 may include a SSD 110 in communication with a memory access device such as a processor 120. The system 100 may be considered a host system of the SSD 110 in that it controls the operation of the SSD 110 through, for example, the processor 120. The system 100 may employ one or more applications (host applications) to access the SSD 110. Some examples of system 100 may include personal computers, laptop computers, personal digital assistants (PDAs), digital cameras, electronic games, digital media player/recorders, and the like.

The processor 120 may comprise a disk drive controller or other external processor. The processor 120 may communicate with the SSD 110 via a communication bus 130. The communication bus 130 may employ a known protocol to connect the processor 120 to the SSD 110. The type of communication bus 130 may depend on the type of drive interface being utilized in the system 100. Examples of some conventional disk drive interface bus protocols are Integrated Drive Electronics (IDE), Advanced Technology Attachment (ATA), Serial ATA (SATA), Parallel ATA (PATA), Fiber Channel and Small Computer System Interface (SCSI). Other drive interfaces exist and are known in the art. The memory devices of the SSD 110 may include non-volatile flash memory devices. A more detailed description of features of the SSD 110, as related to data write management, will be given below.

Figure 2:
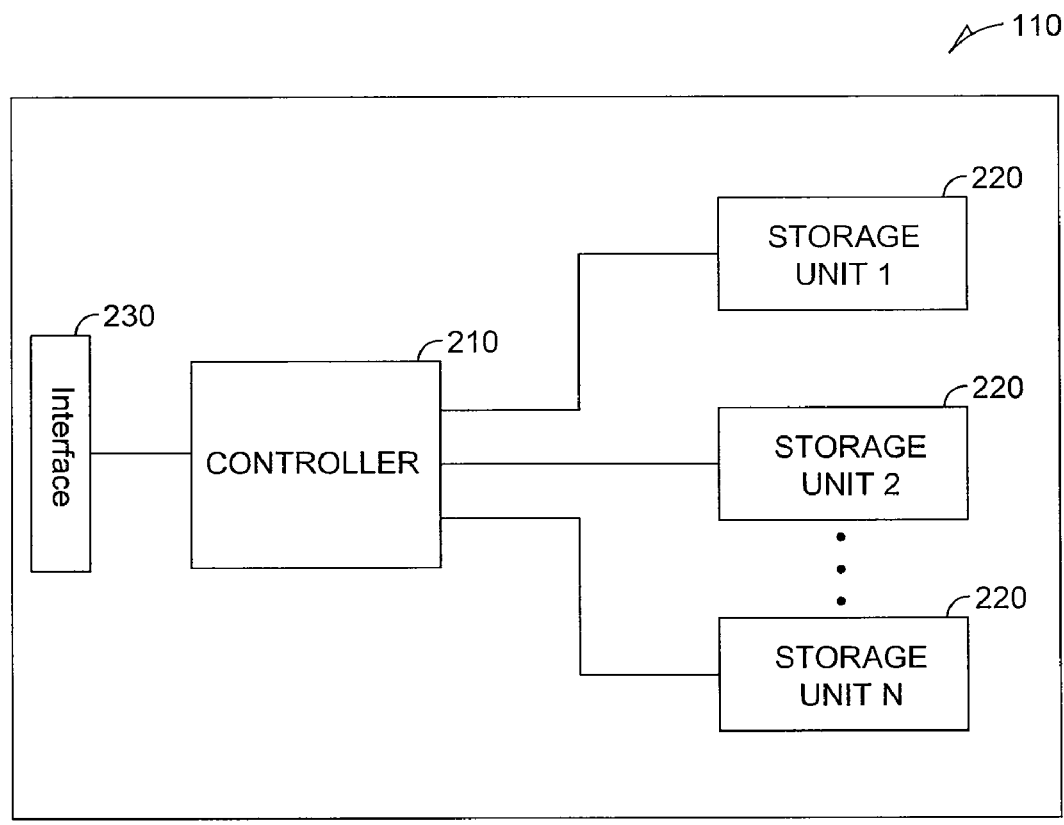
FIG. 2 is a diagram illustrating an SSD configured to manage data writes, according to various embodiments of the invention.

FIG. 2 is a diagram illustrating the SSD 10 configured to manage data writes, according to various embodiments of the invention. The SSD 110 may include a controller 210 coupled to an interface 230 that allows communication with a host (e.g., the processor 120 of FIG. 1, or a host application) via the communication bus 130 (FIG. 1). The interface 230 may be one of many connectors commonly known to those of ordinary skill in the art. Some example of theses interface 230 connectors may include IDE, enhanced IDE, ATA, SATA, and Personal Computer Memory Card International Association (PCMCIA) connectors.

The memory in the SSD 110 may be organized into multiple storage units 220 each comprising one or more memory devices, such as flash memory devices. Memory locations in memory devices may be grouped into blocks. In flash memory devices, blocks having storage capacities of 128 kilobytes (KB), 256 KB and 512 KB are common. The host may not be aware of which flash memory devices are currently being addressed for data read/write operations. In other words, the host is not aware of any physical block address (PBA) that is accessed in an actual data transfer (e.g., read or write). The host merely deals with a logical block address (LBA), which is translated into a PBA. This translation from LBA to PBA may occur within the SSD 110, after the SSD 110 receives a request for data transfer specifying a logical address.

In flash memory devices, before writing new data, a block of memory is erased to make room for the new data. For example, when the host requests a data write of only 4 KB, a block of memory (e.g., 128 KB) will be erased to accommodate the 4 KB of data. If 2 storage units, each comprising blocks that each have a storage capacity of 128 KB, are allocated to service the request, then two blocks (one from each of the 2 allocated storage units) will be erased to accommodate the 4 KB of data The erase time may constitute a primary factor in slowing the access time of flash memory devices. In conventional memory devices, data can be written to a memory location within a flash memory a finite number of times. Even though the allowable number of writes is large (typically 10,100 to 100,000), writing to the same location over and over may wear out that location. Therefore, it is prudent to spread data writes evenly across available memory locations to level the amount of wear. Wear leveling is considered one of the tasks that the controller 210 (also called SSD controller) is responsible for managing.

With data being stored in multiple locations in the SSD 110, and hidden from the host 120, a large amount of manipulation may be performed to write and retrieve data from the SSD 110. As data becomes increasingly fragmented, blocks of memory of sufficient size to write data properly may become scarce. At this point, data reclamation (sometime referred to by those of ordinary skill in the art as garbage collection) procedures are used to reclaim blocks of memory in order to allow additional writes to the SSD 110. The more often data is physically moved within the SDD 110, the faster the drive can wear out due to program erase cycles.

In an example embodiment, the host may specify a data transfer bandwidth (e.g., a write bandwidth, such as a lowest acceptable write bandwidth, or a read bandwidth) to be considered by the controller 210, when servicing a host data transfer request. The term "data transfer bandwidth" shall be taken to include a quantity of a data transferred per unit time, commonly expressed in kilobits per second (Kb/s) or megabits per second (Mb/s). A larger data transfer bandwidth can be achieved by allocating more storage units 220 to service a data transfer request, for example, establishing the number of storage units that may have a block used to service the data transfer request.

Another variable of interest to the controller 210 is write amplification (WA). The term "write amplification" refers to, for example, the ratio of the size of memory allocated to be used to service a data write to the size of the actual data written to the memory allocated to service that request. For example, writing 4 KB of data to the SSD 110 may result in the controller 210 servicing a write operation with the lowest usable number of storage units—one storage unit of the memory, which can include a block that can store, for example, 128 KB. In this case of the memory locations in a 128 KB data block of the one allocated storage unit 220 are erased, even though only 4 KB of actual data that make up the write request is written to that block. This results in a WA of 128/4, i.e., 32, which may not be desirable.

Operating by the SSD 110 with lower WA values may result in a more efficient use of the memory devices in the SSD 110. Operating at lower WA values may also result in more evenly-distributed wear leveling but, at the same time, lower write bandwidths. Therefore, the SSD 110 may be faced with a tradeoff between the write bandwidth specified by the host and the WA resulting from the data write.

The SSD 110 can be configured to address this trade off. For example, the SSD 110 may employ the controller 210 to address the tradeoff by adjusting the allocation of storage units 220, based on the embodiments described hereinafter.

Figure 3:
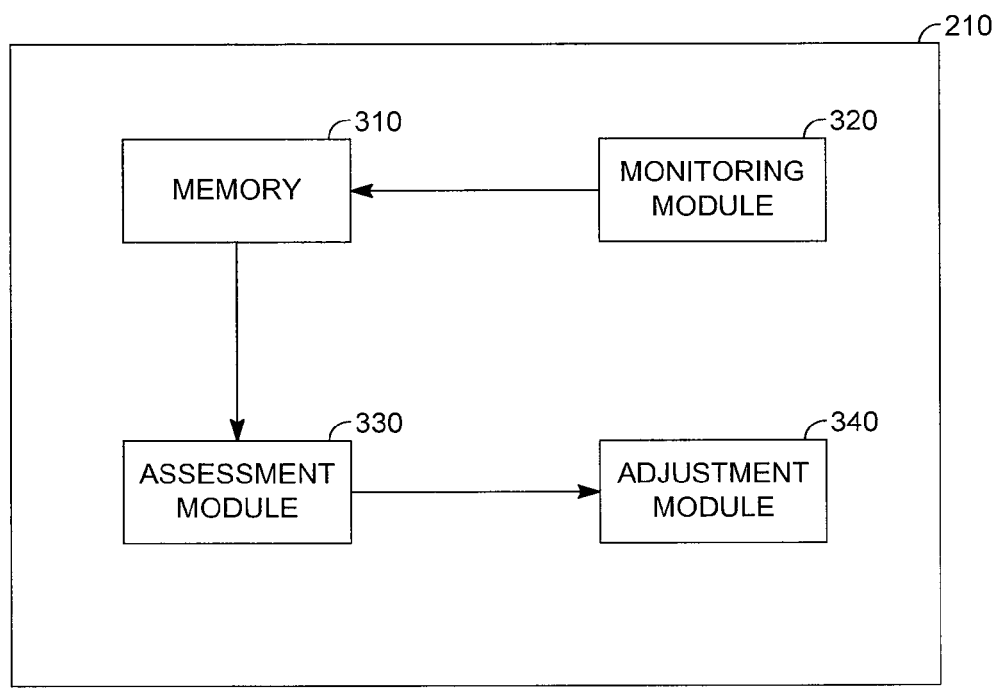
FIG. 3 is a diagram illustrating modules of an SSD controller configured to manage data writes, according to various embodiments of the invention.

FIG. 3 is a diagram illustrating modules of an SSD controller 210 to manage data writes, according to various embodiments of the invention. The SSD controller 210 shown in FIG. 3 may, for example, comprise one or more microprocessors. The SSD controller 210 may include a memory 310, a monitoring module 320, an assessment module 330, and an adjustment module 340. The monitoring module 320, the assessment module 330, and the adjustment module 340 may comprise software modules stored in memory 310 or the storage units 220 in FIG. 2. In an example embodiment, these modules may be implemented as embedded hardware in the SSD controller 210.

The monitoring module 320 may operate to monitor a data transfer between a host (e.g., the processor 120 of FIG. 1 or a host application) and an memory, such as the memory organized into the storage units 220 of FIG. 2. For example, the monitoring module 320 may have the capability to monitor one or more characteristics of a data transfer, such as the sizes of the data transfers (e.g., number of bytes transferred), write amplification (WA associated with the data transfer), and write bandwidth (BW) associated with the data transfer. In example embodiments, other characteristics such as reclamation bandwidth (e.g., a processor bandwidth reserved for garbage collection) and read bandwidth may also be monitored.

The monitoring module 320 may store one or more values associated with the monitored characteristic(s) in the memory 310. The memory 310 may include a static random access memory (SRAM) used in the form of one or more configuration registers. In an example embodiment, the monitoring module 320 may store the characteristic values in flash memory devices organized into the storage units 220 of FIG. 2. The stored characteristic values may be associated with the host.

In an example embodiment, the assessment module 330 may comprise a processor (e.g. a microprocessor). In some embodiments, it is likely the monitoring module 320 and/or the adjustment module 340 also comprise the same processor. The assessment module 330 may operate to retrieve the characteristic values, stored over a period of time, from the memory 310. The assessment module 330 may determine statistical values based at least in part on characteristic values. For example, the assessment module 330 may determine an average value of the WA or the write bandwidth stored over a period of time. The assessment module 330 may also determine an average value of a memory request size over a period of time.

The assessment module 330 may compare one or more of the characteristic values and/or the statistical values (collectively and/or individually referred to herein as "the data transfer profile" with one or more target values. The assessment module 330 may, for example, compare the average WA with a target WA and report the results to the adjustment module 340. In an example embodiment, the assessment module 330 may indicate that a characteristic value (e.g., WA) shows an improvement over previous values.

The adjustment module 340 may implement an algorithm such as one that evaluates the relationship between two or more of the characteristic values and/or statistical values, such as to adjust the number of storage units allocated to service a future data transfer, as described in more detail below, with respect to FIG. 5.

Additional or different modules could be implemented within the SSD 210 as are known in the art without departing from the scope of the disclosure. However, the present disclosure may be understood without such additional modules.

FIG. 4 is a table 400 of some variables involved in managing data writes to the SSD 110 of FIG. 1, according various embodiments of the invention. The variables in table 400 are memory request size in KBs, WA, and the number of storage units (i.e., LUs) allocated to service a data transfer request. Column 420 lists sizes of a number of write requests made by a host (e.g., processor 120 in FIG. 1 or a host application). The controller 210 in FIG. 2 may respond to each request by allocating a number of storage units for the data write. Columns 430, 440, 450, and 460 represent corresponding WA values resulting from allocation of 2, 4, 6, and 10 storage units (i.e., one block from each 2, 4, 6, and 10 LUs), to the data write requests, respectively. In the table 400, each block of storage units are assumed to have 128 KB of storage capacity. Other capacities may be used. The data in table 400 are also represented in the graph shown in FIG. 5.

Figure 5:
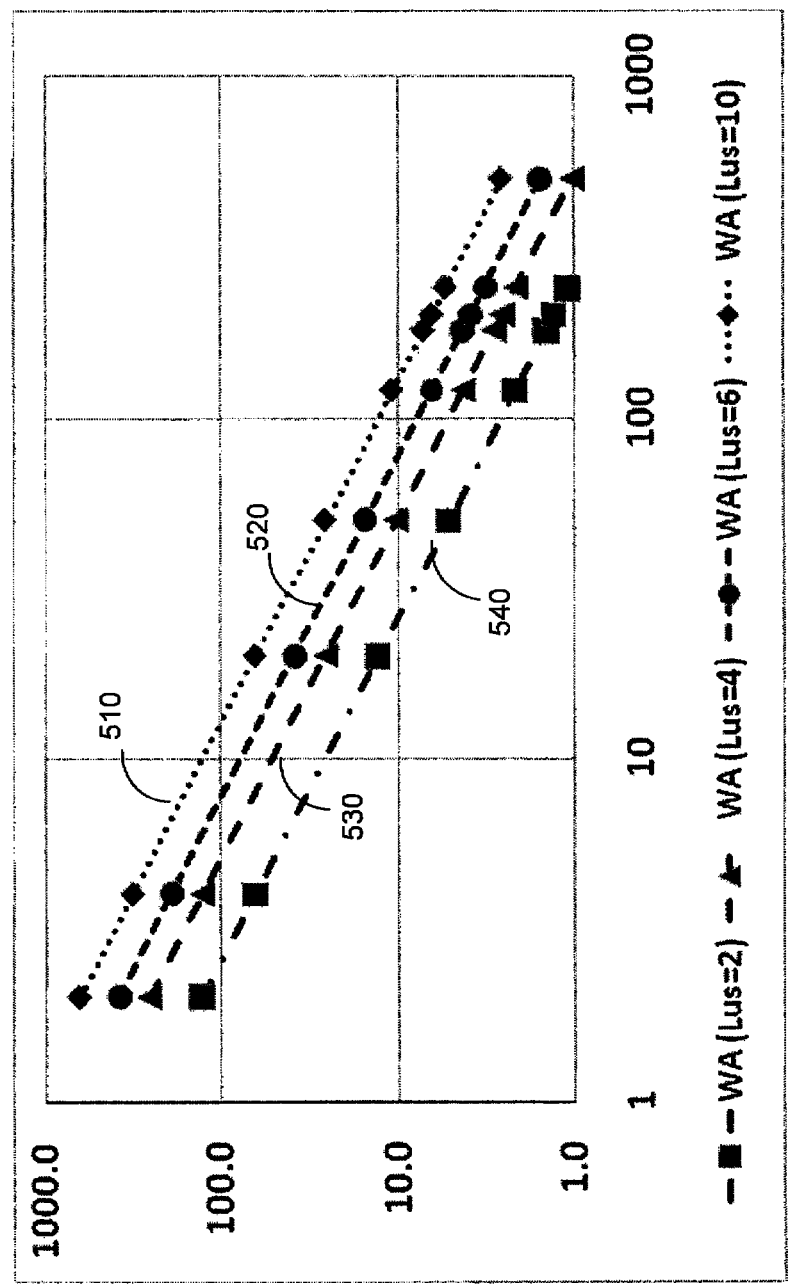
FIG. 5 is a graph illustrating changes in the variables of the table shown in FIG. 4, according to various embodiments of the invention.

FIG. 5 is a graph 500 illustrating changes in the variables of the table 400 shown in FIG. 4, according to various embodiments of the invention. The graph 500 shows the variation of WA as a function of data write request sizes for different numbers of the storage units allocated to service the data write requests. The corresponding number of allocated storage units for each of the curves 510, 520, 530, and 540 are shown in the legend of the graph as LUs=2, 4, 6, and 10. The general trend, as seen from the graph 500, is a decrease in WA as the size of the requested data writes increases. For small data write request sizes (e.g., less than 128 KB), the controller 210 may have no option other than allocating a single storage unit (where a single block from a single storage unit is used to service the request). However, as the size of the requested data writes increases, the controller 210 may have more options.

For example, if the size of a requested data write is equal to 512 KB, the controller 210 in FIG. 2 may allocate 4 storage units, in which case the write amplification would amount to a value of 1. The controller may achieve a write amplification of 2 if it chooses to allocate 8 storage units for that data write request. With the assumed storage capacity of 128 KB for each storage unit, the desired WA values of 1-2 are shown to occur at the data write request sizes of more than 128 KB.

Figure 6:
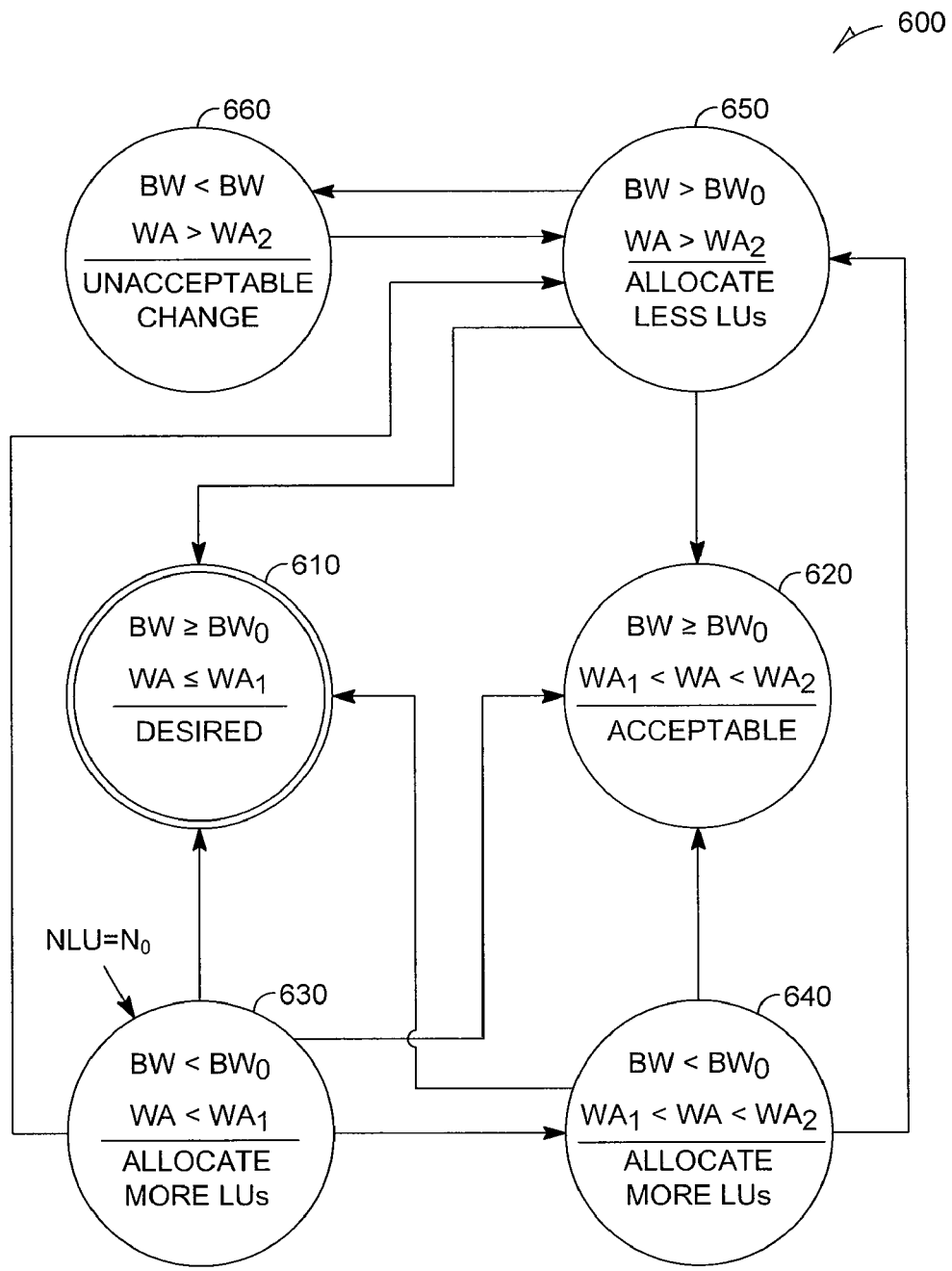
FIG. 6 is a state diagram illustrating implementation of an algorithm for SSD data write management, according to various embodiments of the invention.

FIG. 6 is a state diagram 600 illustrating implementation of an algorithm for SSD data write management, according to various embodiments of the invention. The adjustment module 340 in FIG. 3 may implement the algorithm shown in the state diagram 600. The state diagram 600 shows a number of states and transitions between the states. The states may be defined by variables such as write BW and WA associated with data writes by the controller 210 of FIG. 2, to the SSD 110 of FIG. 1. In the desired state 610, the write bandwidth is considered to be greater than BW0, and the desired write amplification is considered to be less than WA1. The lower limit for the write bandwidth BW0 or an acceptable range for the WA (e.g., between WA1 and WA2) maybe also be specified by the host. For example, a user of the host may specify a desired write throughput target, such as 70% reads, 30% of writes and a minimum write BW of 500 Mb/s. The user may store the target values into the SSD controller 210 (e.g. into the memory 310 of FIG. 3).

In the acceptable state 620, the write bandwidth is greater than BW0 and the WA is within an acceptable range (e.g., less than WA2 and greater than WA1). The objective of the algorithm is to make transitions from all other states to the desired state 610 or the acceptable state 620. For example, the initial state considered by the adjustment module 340 in FIG. 3 may be considered to be a state 630. Before entering this state, the controller 210 in FIG. 2 has serviced a data write request by allocating $N_0$ storage units on the SSD 110 of FIG. 1 to a data write request. The result of such allocation, as monitored by the monitoring module 320 in FIG. 3, is a write bandwidth less than BW0, and the WA less than WA1. Based on this scenario, adjustment module 340 may adjust the situation.

The adjustment module 340 may try to adjust the situation by allocating more storage units to the data write request. This may cause a transition to the desired state 610, the acceptable state 620, or another state, such as state 640. At state 640, the WA is within the acceptable range; however, the write bandwidth is less than BW0. To increase the write bandwidth, the adjustment module 340 may try to remedy the situation by allocating still more storage units. The allocation of more storage units may result in entering the desired state 610, acceptable state 620, or state 650.

State 650 seems to be the result of allocating more than a sufficient number of storage units, because while the bandwidth has increased to an acceptable value, the WA is outside of the acceptable range. The situation may cause the adjustment module 340 in FIG. 3 to decrease the number of storage unit allocated that, in turn, may lead to entering either of the desired state 610 or the acceptable state 620. It may also lead to entering state 660, which may be unacceptable, because neither the write bandwidth nor the write amplification is within the acceptable range specified by state 620. Therefore, the next transition from state 660 would be to go return to state 650 and try another value (e.g., greater than the previous tried values) for the number of storage units to be allocated.

In example embodiments, the adjustment module 340 may store transition information such as the adjustment made to the number of storage units and the monitored results (e.g., write BW, and WA) after each transition in memory 310 of FIG. 3. The adjustment module 340 may use the transition information to improve its efficiency by trying to avoid intermediate states and directly transitioning to the desired or acceptable states 610 and 620, respectively, in FIG. 6. In cases where transitioning to the desired or acceptable states 510 and 520, respectively, is not possible, the adjustment module 340 may try to lower the WA value to an even greater extent.

Figure 7:
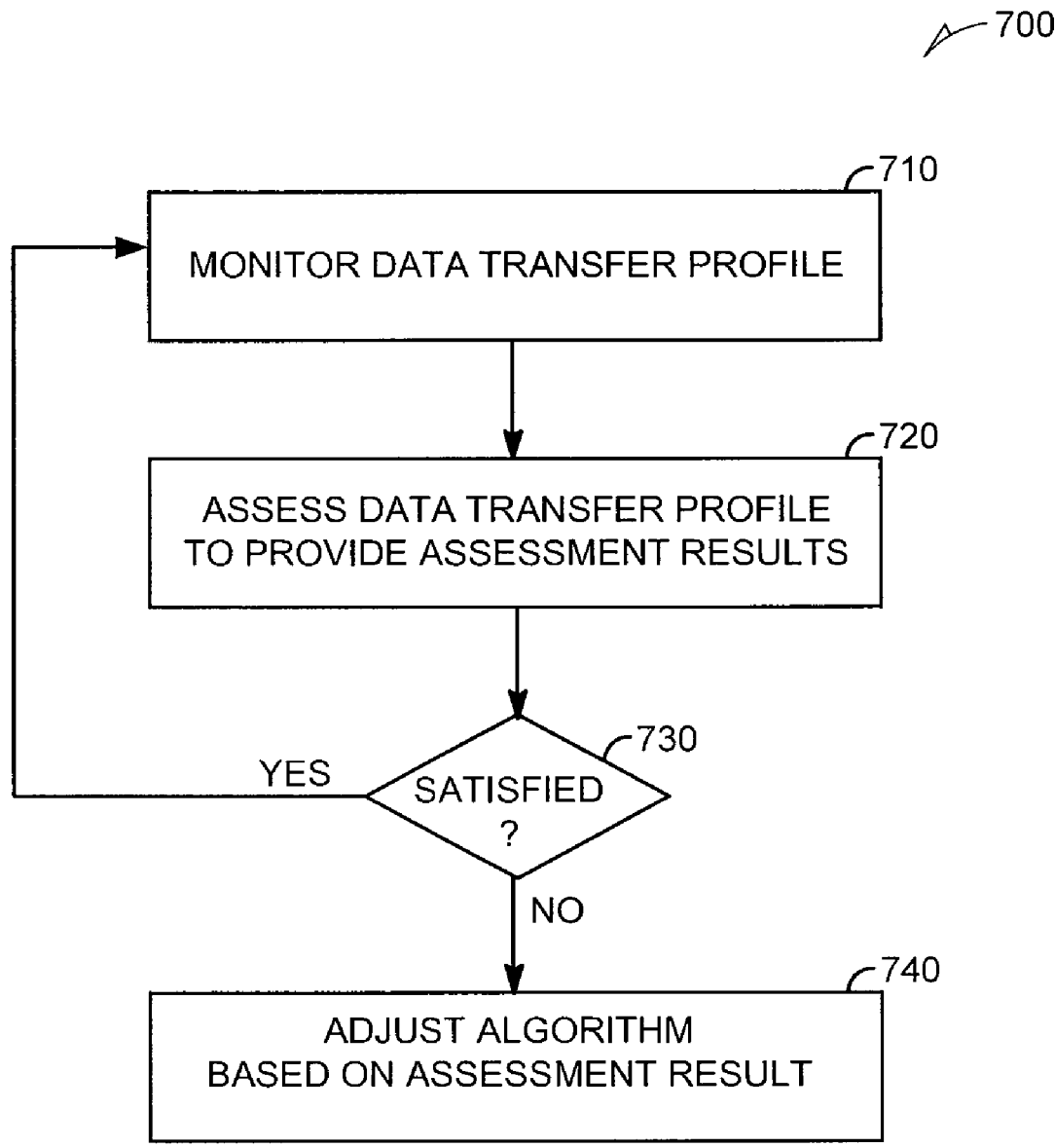
FIG. 7 is a flow diagram illustrating a method of SSD data write management, according to various embodiments of the invention.

FIG. 7 is a flow diagram illustrating a method 700 of SSD data write management, according to various embodiments of the invention. At operations 710 the monitoring module 320 of FIG. 3 may monitor a data transfer between the host and a memory such as a memory organized into storage units 220 of the SSD 110 of FIG. 1. The monitoring module 320 may monitor the data transfer over a time period. The time period may depend on the volume of traffic associated with the data transfer. The assessments module 330 of FIG. 3, at operations 720, may assess the data transfer to provide an assessment result.

The assessment result may comprise a characteristic value including a WA, a data transfer BW, and/or a number of storage units. In some example embodiments, the characteristic value may also or alternatively include a reclamation bandwidth and a read bandwidth. The assessment module 330 may determine a statistical based at least in part on a monitored characteristic value such as an average value of the characteristic value, for example, the average write amplification over a period of time.

The assessment module 330 may provide an assessment result that indicates whether at least one of the characteristic values and/or the statistical values satisfies one or more target values as specified by the host. At a decision block 730, if the assessment result is satisfactory, the control is passed to the operation 710. Otherwise, at operations 740, the adjustment module 340 of FIG. 3, for example, may be used to adjust a characteristic of a data transfer based on the assessment result. The algorithm may be implemented by the adjustment module 340 of FIG. 3, as discussed above. For example, adjustment module 340 may operate to adjust a characteristic such as write bandwidth, write amplification, and the number of storage units.

The adjustment module 340 of FIG. 3 may perform this operation. The adjustment module 340, as discussed above, may operate to change one or more characteristic of a data transfer or keep the characteristic unchanged based on the assessment result. For example, when the number of storage units allocated to service a data write request is proper (determined when the entered states are one of the desired or acceptable states 610 or 620, respectively), the adjustment module 340 may keep that number of allocated storage units unchanged. In case where, the number of storage units allocated to the data write request is not proper, for example, as indicated by a write BW smaller that BW0, the adjustment module 340 may remedy the situation by allocating a larger number of storage units to improve the write BW.

Figure 8:
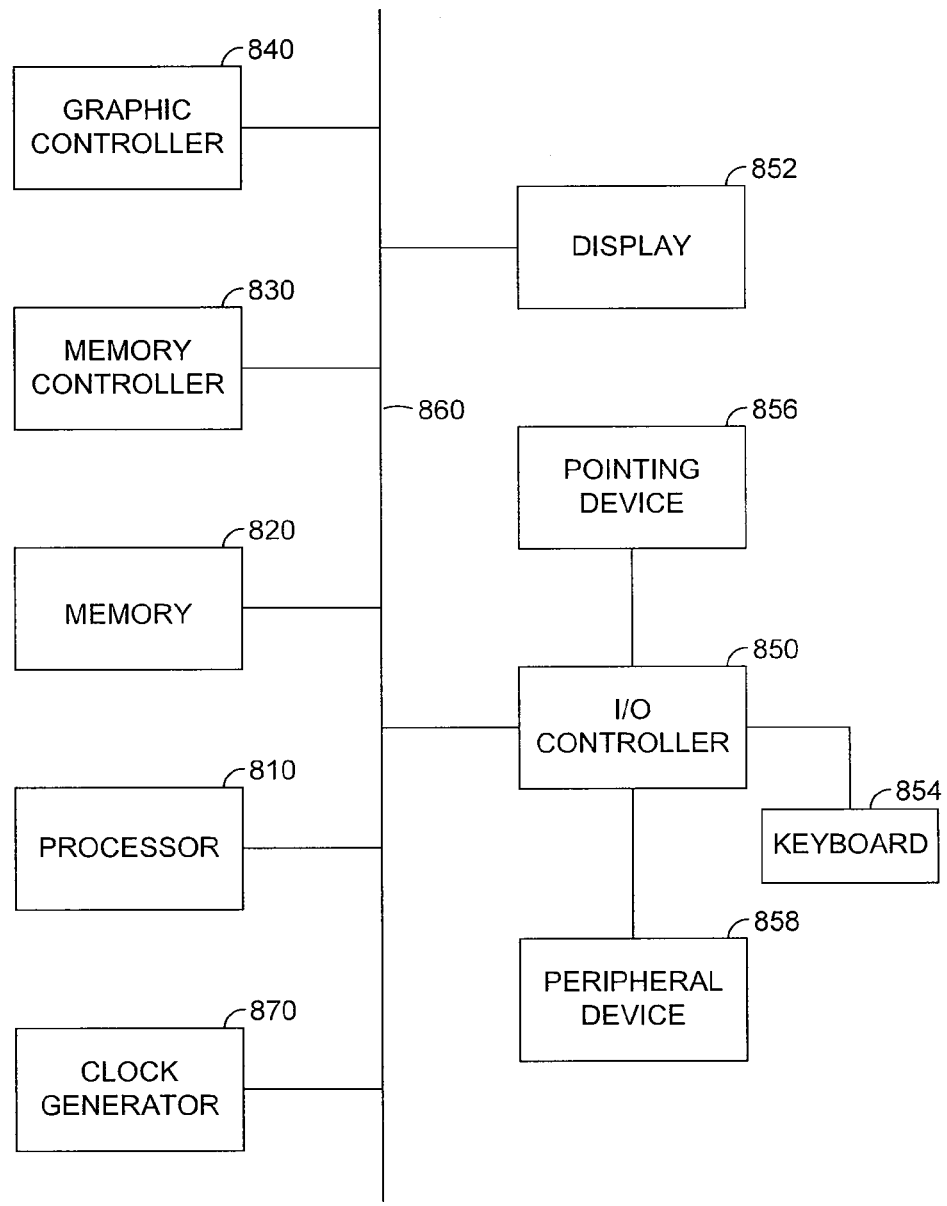
FIG. 8 is a diagram illustrating an example system for managing SSD data writes, according to various embodiments of the invention.

FIG. 8 is a diagram illustrating an example system 800 for managing SSD data writes, according to various embodiments of the invention. The system 800 may include a processor 810, a memory 820, a memory controller 830, a graphic controller 840, and an input and output (I/O) controller 850, a display 852, a keyboard 854, a pointing device 856, and a peripheral device 858. A bus 860 couples all of these devices together. A clock generator 870 provides a clock signal to at least one of the devices of system 800 via bus 860. An example of clock generator 870 may include an oscillator in a circuit board such as a motherboard. Two or more devices shown in system 800 may be formed in a single chip.

Memory 820 may comprise static random access memory (SRAM), dynamic RAM, or non-volatile memory including flash memory. Bus 860 may be interconnect traces on a circuit board or may be one or more cables. Bus 860 may also couple the devices of system 800 by wireless means such as by electromagnetic radiations, for example, radio waves. Peripheral device 858 may comprise a printer, a disk drive unit (e.g., an optical device such as a CD-ROM and a DVD reader and writer, a magnetic device reader and writer such as a floppy disk driver), or an audio device such as a microphone.

System 800 represented by FIG. 8 may include computers (e.g., desktops, laptops, hand-helds, servers, Web appliances, routers, etc.), wireless communication devices (e.g., cellular phones, cordless phones, pagers, personal digital assistants, etc.), computer-related peripherals (e.g., printers, scanners, monitors, etc.), entertainment devices (e.g., televisions, radios, stereos, tape and compact disc players, video cassette recorders/players, camcorders, digital cameras, MP3 (Motion Picture Experts Group, Audio Layer 3) players/recorders, video games, watches, etc.), and the like.

In example embodiments, the peripheral device 858 may include a machine-readable medium on which is stored one or more sets of instructions (e.g., software) embodying any one or more of the methodologies or functions described herein. The instructions may also reside, completely or at least partially, within the memory 820 and/or within the processor 810 during execution thereof by the computer system 800, with the memory 820 and the processor 810 also constituting machine-readable media.

While the machine-readable medium is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

Although specific methods and systems for managing SSD data write operations have been described, it will be evident that various modifications and changes may be made to these embodiments. Accordingly, the specification and drawings are to be regarded in an illustrative rather than a restrictive sense.

The Abstract of the Disclosure is provided to comply with 37 C.F.R. §1.72(b), requiring an abstract that allows the reader to quickly ascertain the nature of the technical disclosure. It is submitted with the understanding that it will not be used to interpret or limit the claims. In addition, in the foregoing Detailed Description, it may be seen that various features are grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

What is claimed is:

1. A method comprising:
   monitoring a data transfer between a host and a memory;
   assessing the data transfer to provide an assessment result; and
   adjusting another data transfer based at least in part on the assessment result, including adjusting a number of storage units allocated to service the other data transfer, based on a size of requested data associated with the other data transfer, and a host-specified data transfer bandwidth and range of acceptable write amplifications.

2. The method of claim 1, wherein the data transfer comprises:
   at least one of writing into or reading from the memory.

3. The method of claim 1, wherein the host comprises a memory access device and the memory comprises nonvolatile memory including flash memory.

4. The method of claim 1, wherein assessing the data transfer comprises:
   assessing a characteristic of the data transfer, wherein the characteristic comprises at least one of a size of the data transfer, a write amplification, a write bandwidth, a reclamation bandwidth, or a read bandwidth.

5. The method of claim 1, further comprising:
   storing a value associated with the assessed characteristic over a time period, the time period depending on a volume of traffic associated with the data transfer.

6. The method of claim 5, further comprising:
   determining a statistical value based at least in part on the value associated with the characteristic.

7. The method of claim 6, wherein the statistical value comprises an average value.

8. The method of claim 7, wherein the assessing comprises:
   comparing at least one of the characteristic value and/or the statistical value with a target value.

9. The method of claim 8, wherein the provided assessment result indicates whether at least one of the characteristic value and/or the statistical value satisfies the target value.

10. The method of claim 4, wherein the provided assessment result indicates whether the characteristic shows an improvement.

11. The method of claim 1, wherein the adjusting comprises:
    adjusting a characteristic of the other data transfer.

12. The method of claim 11, wherein the adjusting a characteristic of another data transfer comprises:
    adjusting a number of storage units allocated to service the other data transfer.

13. The method of claim 12, wherein adjusting the number of storage units allocated to service the other data transfer comprises:

at least one of changing the number or keeping the umber unchanged, based on the assessment results.

14. A storage device controller comprising:
a monitoring module to monitor a data transfer between a host and a memory;
an assessment module to assess the data transfer to provide an assessment result; and
an adjustment module to adjust another data transfer based at least in part on the assessment result, wherein the controller is configured to adjust a number of storage units allocated to service the other data transfer, based on a size of requested data associated with the other data transfer, and a host-specified data transfer bandwidth and range of acceptable write amplifications.

15. The controller of claim 14, wherein the monitoring module is to monitor a characteristic of the data transfer, the characteristic including at least one of a size of the data transfer, a write amplification, a write bandwidth, a reclamation bandwidth, and/or a read bandwidth.

16. The controller of claim 15, further comprising:
memory to store the characteristic value over a time period, the time period depending on a volume of traffic associated with the data transfer.

17. The controller of claim 16, wherein the assessment module is to retrieve the characteristic values stored over the time period.

18. The controller of claim 14, wherein the assessment module comprises:
one or more processors.

19. The controller of claim 16, wherein the assessment module is to determine a statistical value associated with the characteristic values, and wherein the statistical value includes an average value.

20. The controller of claim 19, wherein the assessment module is to compare at least one of the characteristic value and/or the statistical value with a target value.

21. The controller of claim 20, wherein the assessment module is to determine whether at least one of the characteristic values and/or the statistical value satisfies the target value.

22. The controller of claim 16, wherein the assessment module is to determine whether at least one of the characteristic values shows an improvement.

23. The controller of claim 16, wherein the adjustment module is to adjust the number of storage units in a number of transitions to achieve a target value for the characteristic value and/or the statistical value, and wherein transition information is stored in memory and used to improve an adjustment efficiency.

24. The controller of claim 16, wherein the storage unit comprises a block of memory.

25. A system comprising:
a memory access device; and
a storage device coupled to the memory access device, the storage device comprising:
memory;
a monitoring module to monitor a data transfer between the memory access device and the memory;
an assessment module to assess the data transfer to provide an assessment result; and
an adjustment module to adjust another data transfer based at least in part on the assessment result, wherein the adjustment module is configured to adjust a number of storage units allocated to service the other data transfer, based on a size of requested data associated with the other data transfer, and a host-specified data transfer bandwidth and range of acceptable write amplifications.

26. The system of claim 25, wherein the memory comprises:
nonvolatile memory including flash memory.

27. A non-transitory machine readable medium storing instructions, which when executed by one or more processors perform the following operations:
monitoring a data transfer between a host and a memory;
assessing the data transfer to provide an assessment result; and
adjusting another data transfer based at least in part on the assessment result, wherein a controller of the memory is configured to adjust a number of storage units allocated to service the other data transfer, based on a size of requested data associated with the other data transfer, and a host-specified data transfer bandwidth and range of acceptable write amplifications.

28. A method comprising:
monitoring a characteristic of a data transfer between a host and memory, the characteristic comprising at least one of a size of the data transfer, a write amplification, a write bandwidth, a reclamation bandwidth, and/or a read bandwidth;
comparing at least one of a value of the monitored characteristic and/or a statistical value based at least in part on the monitored characteristic with a target value; and
adjusting a number of storage units of the memory that are allocated to another data transfer based at least in part on the comparison, wherein a controller of the memory is configured to adjust a number of storage units allocated to service the other data transfer, based on a size of requested data associated with the other data transfer, and a host-specified data transfer bandwidth and range of acceptable write amplifications.

* * * * *

UNITED STATES PATENT AND TRADEMARK OFFICE
CERTIFICATE OF CORRECTION

| | | |
|---|---|---|
| PATENT NO. | : 8,291,131 B2 | Page 1 of 1 |
| APPLICATION NO. | : 12/498151 | |
| DATED | : October 16, 2012 | |
| INVENTOR(S) | : Joe M. Jeddeloh | |

It is certified that error appears in the above-identified patent and that said Letters Patent is hereby corrected as shown below:

In column 9, line 1, in Claim 13, delete "umber" and insert -- number --, therefor.

Signed and Sealed this
Twenty-fifth Day of December, 2012

David J. Kappos
*Director of the United States Patent and Trademark Office*